United States Patent
Biet et al.

[15] 3,697,760
[45] Oct. 10, 1972

[54] OPTICAL-ELECTRICAL MOVEMENT DETECTOR UTILIZING STAGGERED ROWS OF PHOTODETECTORS AND LOGIC FOR DETERMINING THE LOCATION OF A LUMINOUS SPOT

[72] Inventors: Jean-Pierre Biet, Saulx-Les-Chartreux; Quang Tan Nguyen, Fontenay-Aux-Roses; Gerard Peres, Roussigny-Limours; Gérard Ripoche, Massy, all of France

[73] Assignee: Compagnie Generale D'Electricite, Paris, France

[22] Filed: Aug. 17, 1971

[21] Appl. No.: 172,532

[52] U.S. Cl. ............................250/209, 250/220 M
[51] Int. Cl. ...............................................H01j 39/12
[58] Field of Search .....250/203, 208, 209, 220 M X; 346/23

[56] References Cited

UNITED STATES PATENTS 3,555,285   1/1971   Irving.....................250/220 M

Primary Examiner—Walter Stolwein
Assistant Examiner—T. N. Grigsby
Attorney—Richard C. Sughrue et al.

[57] ABSTRACT

An optical-electrical detecting device comprising a series of staggered photo-sensitive diodes are appropriately connected to electronic circuits for providing a signal corresponding to the position of a relatively small luminous spot. The photo-diodes are arranged in two rows and are separated by baffle reflectors for providing a signal through logic gates to an integrated parity control circuit for defining the position of the luminous spot.

5 Claims, 3 Drawing Figures

INVENTORS
JEAN-PIERRE BIET
QUANG TAN NGUYEN
GERARD PERES
GERARD RIPOCHE

BY Sughrue, Rothwell, Mion, Zinn & Macpeak
ATTORNEYS

OPTICAL-ELECTRICAL MOVEMENT DETECTOR UTILIZING STAGGERED ROWS OF PHOTODETECTORS AND LOGIC FOR DETERMINING THE LOCATION OF A LUMINOUS SPOT

BACKGROUND OF THE INVENTION

1. Field of the Invention

The present invention concerns the electronic detection of the position of a fine luminous spot. More particularly, the present invention utilizes a plurality of staggered rows of photo-diodes to improve the definition possible with a conventional arrangement of photo-diodes on a silicone ship.

2. Description of the Prior Art

It has been known that the sweeping of a fine luminous spot across a succession of optical-electrical elements consisting of photo-sensitive diodes connected to electronic circuits can determine the position of the luminous spot. Generally, these photo-sensitive diodes are aligned side-by-side on a silicone chip. Using the integrated circuit technique, it is possible to dispose about ten photo-diodes over a distance of not more than 3 millimeters. The photo-diodes are spaced evenly apart and their illumination by a luminous spot would make it possible to effect a sweep whose position could be determined in accordance with the illuminated photo-diodes. Generally, the photo-diodes are each connected to amplifiers and the current produced by the illumination of each photo-diode is selectively transmitted to detectors which may for example be pilot lamps. This process, however, has heretofore been lacking in precision. This is caused by the fact that an interruption in the light generated signals occurs due to the fact that the photo-diodes cannot be contiguous and that spaces or intervals exist between the photo-diodes creating zones which would be insensitive to the illumination of the light beam. By necessity, the photo-diodes have some length and thus, effect the possible definition that can be generated by the scanning of the luminous spot.

SUMMARY OF THE INVENTION

The present invention makes it possible to obviate these disadvantages of prior art by positioning the photo-diodes to attain a more precise definition and in fact, a definition that is better than the longitudinal dimensions of the photo-diodes.

The present invention relates to an optical-electrical movement detector which comprises a pair of strips of optical-electrical elements constructed to form an integrated circuit. The optical-electrical elements are disposed side-by-side in a row and are separated by insensitive spaces, however, a second strip is staggered in relationship to the first strip and is thereby capable of generating a relatively continuous signal. Means is provided for illuminating by a luminous spot, the strip of photo-diodes. The luminous spot is adapted to illuminate both staggered rows and to have a dimension parallel to the length of the rows such that it can only illuminate in one of the rows either the photo-diode element or its intermediate insensitive space. Its dimension perpendicular to the length of the rows being such that it can illuminate at any instance, depending on its position either one of the elements of the first row and one of the elements of the second row, or a corresponding element of either row and a corresponding insensitive area. Therefore, the succession of intervals is provided along the length of both strips such that a signal is generated regardless of the position of the illuminating spot. Additional logic means are designed to receive the output signals from all the elements and are adapted to indicate the exact interval in which the luminous spot is situated.

BRIEF DESCRIPTION OF THE DRAWINGS

An example of the present invention will be described as a means of example by way of illustration, with reference to the accompanying digramatic figures in which all of the like elements are denoted by like references.

DESCRIPTION OF THE PREFERRED EMBODIMENT

Figure 1:
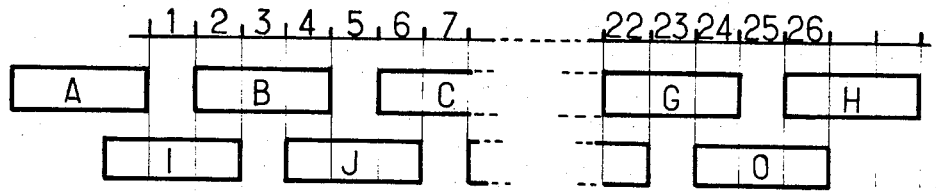
FIG. 1 is a diagramatic plan view of a strip of photo-diodes.

Referring to FIG. 1, there will be seen two rows of photo-diodes, A through H and I through O. These two rows are staggered in relation to one another. Each of the diodes has a length equal to 300 microns with a space separating the photo-diodes equal to 100 microns. A rectangular luminous spot whose smaller side is less than 100 microns and whose larger side is situated astride the two rows is provided to sweep the two rows of photo-diodes. If, for example, the number of photo-diodes is 15, it would be possible to determine 26 intervals numbered from 1 to 26, whose length is 100 microns and where the luminous spot would overlap either one photo-diode or two photo-diodes of two separate rows. Thus, the interval 1 is defined as an illumination of the photo-diode I alone. Likewise, the interval 2 corresponds to the illumination of a part of the photo-diodes B and I.

Figure 2:
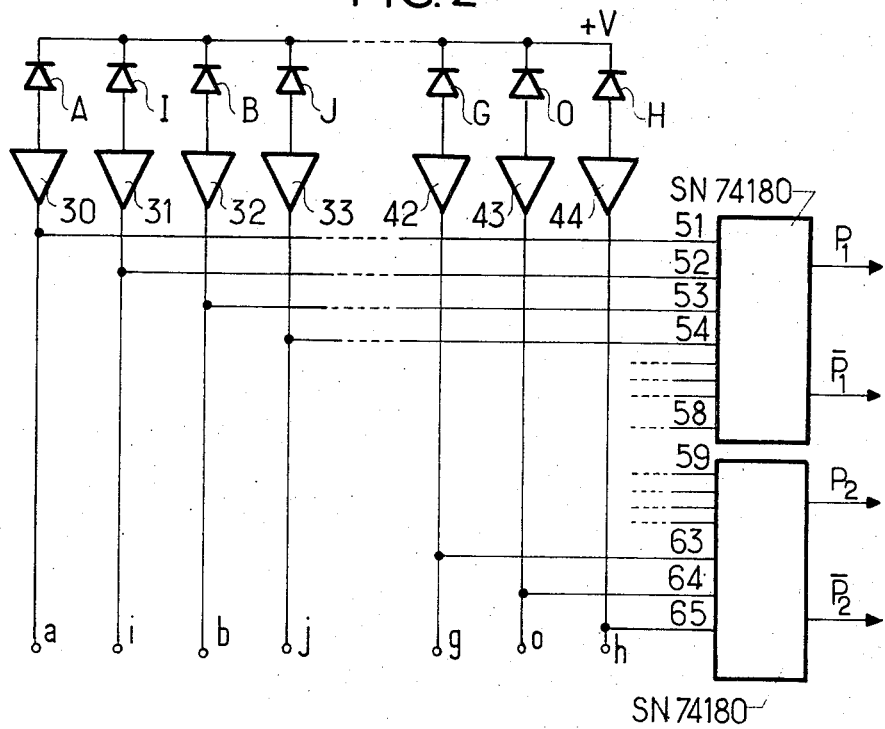
FIG. 2 is an electric circuit diagram showing the connections between the photo-diodes and a parity check circuit.
Figure 3:
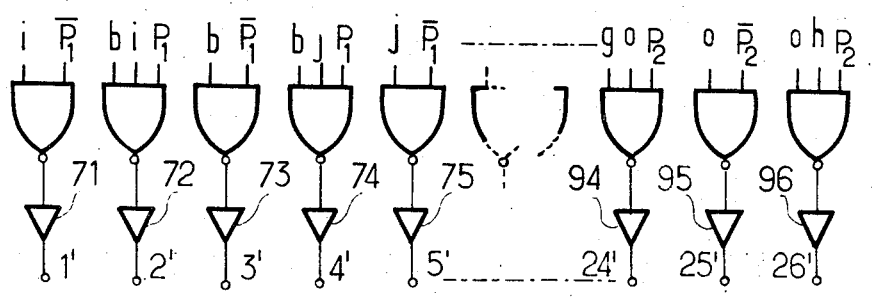
FIG. 3 is an electric circuit diagram showing the connections of the NOT-AND gates to the photo-diodes, to the parity check and to the pilot lamps.

In FIG. 2, the same photo-diodes, A through H, are shown biased by a voltage +V. The photo-diodes are connected respectively to amplifiers 30 through 44, the function of which is to amplify the weak current in the order of a microampere supplied by each photo-diode at the instant of its illumination. The amplifiers are composed of three transistors constituting a Darlington connection and to make it possible to match very high input impedances of the order of ten megohms to a low impedance of the order of 100 ohms. Each of these amplifiers 30 through 44 feeds the terminals 51 to 65 of two integrated circuits SN 74180 which have a parity check function. The number of these input 51 to 65 is limited to eight for each of these circuits. At each circuit SN 74180, there are two output terminals P1, $\bar{P}1$ and P2, $\bar{P}2$. The terminals P1 and P2 correspond to the even outputs and the terminals $\bar{P}1$ and $\bar{P}2$ correspond to the odd outputs. If the number of effective items of information received at the input is even, P1 or P2 supplies a logic 1 signal, while $\bar{P}1$ or $\bar{P}2$ supplies a logic 0 signal. If the number of effective items of information received at the input is odd, P1 or P2 supplies a logic 0 signal, while P̄1 or P̄2 supplies a logic 1 signal. Terminals a through h are branched from the input terminals 51 to 65 and are connected to the amplifiers 30 to 44.

NOT-AND gates, such as iP̄1 comprise either two or three inputs. There are 26 such gates in the illustrated example and they correspond to the number of previously defined intervals. When the gate has only two inputs, it corresponds to an interval in which a single diode is illuminated. One of the inputs is reserved for a connection coming from the diode. The other input is connected to the odd output terminal P̄1 or P̄2. When these two items of information reaching the input terminals of the gate are compatible, and only when this is the case, the NOT-AND gate supplies a logic 0 signal. For example, the gate iP̄1 supplies a logic 0 signal when i is present and P̄1 supplies an odd signal, which corresponds to the state 1.

When the gate has three inputs, the gate will correspond to an interval in which two diodes of two different rows are illuminated. Two inputs of the gate are reserved for connections coming from the two diodes. The third input is connected to the even output terminal P1 or P2. When the three items of information reaching the three input terminals of the gate are compatible, and only when this is the case, the NOT-AND gate supplies a logic 0 signal. For example, the gate biP1 supplies the logic 0 signal when b and i are present and when P1 supplies an even signal corresponds to the state 1.

In conclusion, the NOT-AND gates supply a logic 0 signal only in the case where all the input signals of the gate are present. If one of the signals is absent, or if the parity does not correspond to the number of illuminated diodes, the logic 1 signal is obtained at the output of the NOT-AND gate.

Only the logic 0 signal is capable of setting in operation the amplifiers 71 to 96, of which there are 26 and which are connected to each gate. These amplifiers consist of two transistors, the collector of one being connected to the base of the other and having emitters which are grounded. When the 0 signal arrives at the base of the first transistor, the latter becomes non-conductive, which has the effect of saturating the second.

The collector circuit of the second transistor comprises a pilot value such as 1', which lights up when the second transistor is saturated. The logic 0 signals coming from the NOT-AND gates have the effect of visually displaying these signals by means of the pilot lamps 1' to 26'. The passage of the luminous spot through the gaps bounded by the photo-diodes AlB through to O is thus rendered visible owing to the pilot lamps 1' to 26'.

It should be noted that the combination logic elements need not comprise a parity check circuit, and it may produce the same result with the same number of gates as before, but at the expense of the simplicity of the wiring. The present invention may be employed in all cases where the movement of a light beam cannot be defined with the naked eye. It may be most advantageously employed in laboratories, in the metrological field and in industry. Particularly useful applications have been found in the reading of dials of measuring instruments, facsimile apparatus or cathode beam servomechanisms.

Although the present invention has been described with respect to the preferred embodiment, it will be appreciated that various modifications may be made thereto without departing from the scope of the invention and accordingly, the present invention should be measured only from the following claims.

What is claimed is:

1. An optical-electrical movement detector comprising a first strip of optical-electrical elements capable of generating an electrical output when activated with light;

a second strip of optical-electrical elements arranged adjacent, but staggered in relationship to the first strip, each strip having portions between the optical-electrical elements that are not responsive to light;

means for generating and sweeping a luminous spot across the strip of optical-electrical elements, the luminous spot having a dimension parallel to the length of the strip so that it can only illuminate either one of the optical-electrical elements, or the non-responsive portion of a strip, the luminous spot having a perpendicular dimension that includes the combined width of both the first and second strips;

an integrated circuit means connected to the first and second strip elements for generating signals in response to the luminous spot, and logic means for receiving the output signals from each optical-electrical element and adapted to indicate the exact location of the luminous spot whereby the luminous spot will alternately activate only one optical-electrical element in one row and then activate one optical element in both rows.

2. An optical-electrical movement detector as in claim 1, where the length of the optical-electrical elements is three times the length of the portions not responsive to light.

3. An optical-electrical movement detector as in claim 1, where the logic means includes at least one integrated parity check circuit, the integrated parity check circuit having separate terminals connected to each optical-electrical element and supplying, depending upon the number of illuminated elements, an even number or an odd number with corresponding logic 1 or 0 signals at their first even output and logic 0 or 1 signals at their second odd output respectively.

4. An optical-electrical movement detector as in claim 3, where the logic means further includes a plurality of AND gates corresponding to the number of position intervals, each gate having two inputs with one input connected to an optical-electrical element and the other input connected to a second odd output.

5. An optical-electrical movement detector as in claim 3, where the logic means further includes a plurality of AND gates corresponding to the number of position intervals, each gate having three inputs with two inputs connected to an optical-electrical element and the other input connected to the first even output of the integrated parity check circuit.

* * * * *